Aug. 8, 1961  M. F. WIESER  2,995,039
ERECTION CUTOFF APPARATUS
Filed Oct. 23, 1959
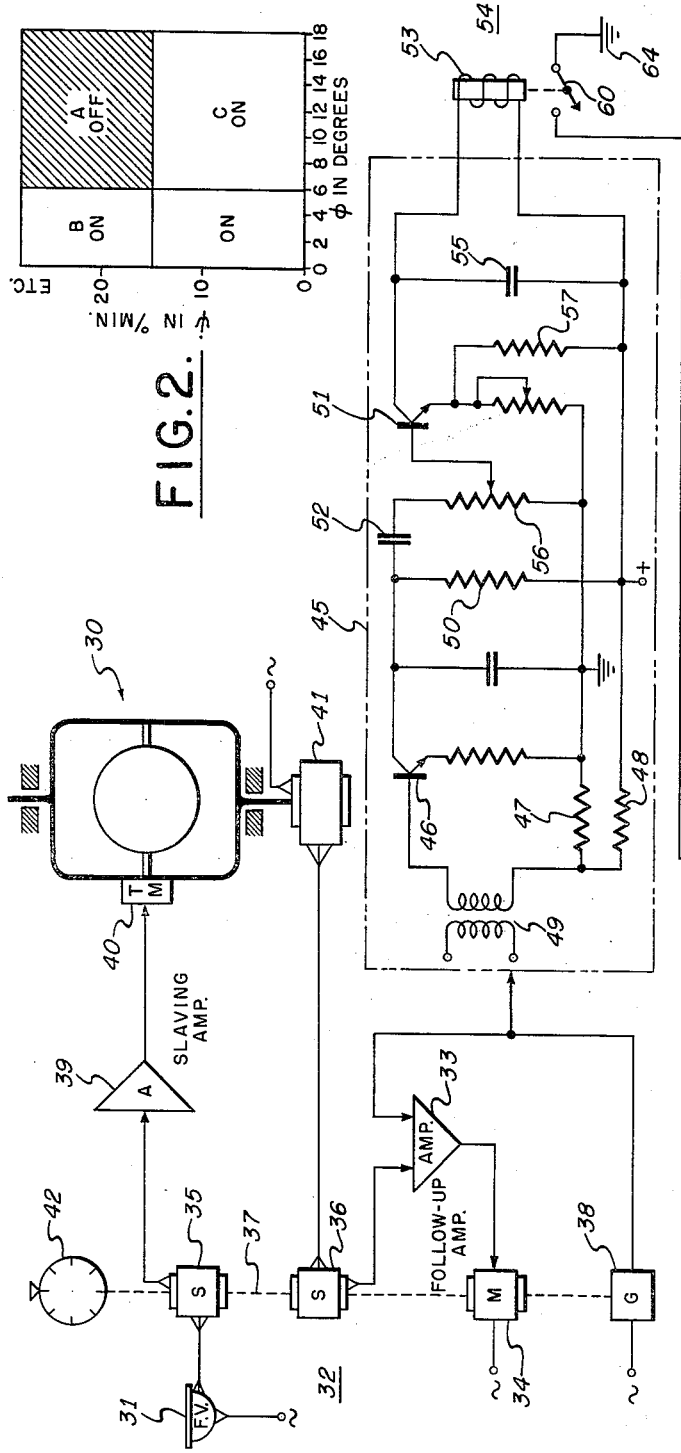
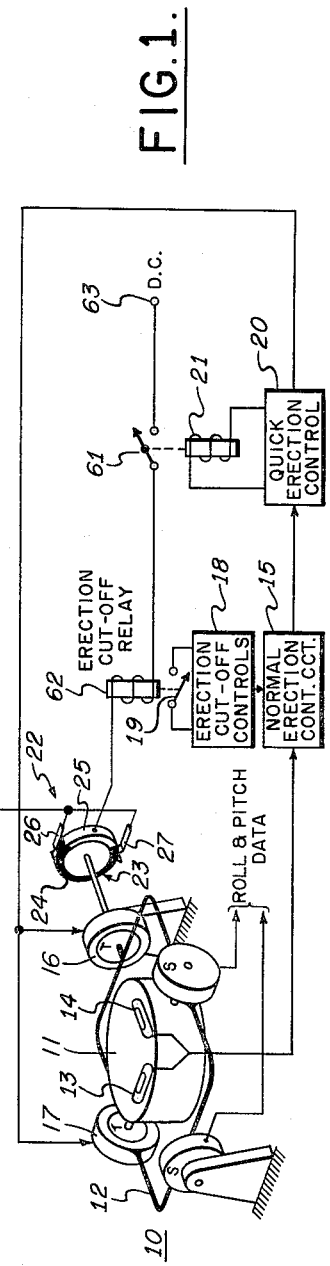
INVENTOR
MITCHEL F. WIESER
BY
ATTORNEY

United States Patent Office 2,995,039
Patented Aug. 8, 1961

2,995,039
ERECTION CUTOFF APPARATUS
Mitchel F. Wieser, Valley Stream, N.Y., assignor to Sperry Rand Corporation, a corporation of Delaware
Filed Oct. 23, 1959, Ser. No. 848,398
9 Claims. (Cl. 74—5.41)

My invention relates to gyroscopic apparatus and, more particularly, to gyroscopic instruments for aircraft of the type which supply long term displacement references for the aircraft.

Displacement gyroscopes are usually slaved to earth-based references such as the earth's gravity field and/or the earth's magnetic field. For example, a gyroscope which is designed to define the vertical is usually slaved to a pendulous reference such as liquid levels or pendulums which detect tilt of the gyro from its true vertical position. Directional gyroscopes may be slaved to the horizontal component of the earth's magnetic field through a magnetic detector device such as, for example, a flux valve which may be maintained horizontally disposed by use of a pendulous mass. Therefore, when the aircraft turns or is subjected to lateral accelerations, the gravity or pendulous references will be caused to align themselves with the apparent vertical rather than the true vertical and, under such conditions, it is desired to remove or at least modify such slaving from the gyroscopes.

My invention as disclosed herein is embodied in a system wherein the erection of a vertical reference such as a vertical gyroscope is cut off or rendered ineffective or otherwise modified under flight conditions which result in excessive lateral accelerations, although it should be understood that the invention is not limited to such a device but also, or in addition, may be employed to cut off or otherwise modify the slaving of a directional gyro to the earth's magnetic field when lateral accelerations cause the flux valve to be tilted away from the horizontal. Furthermore, in the illustrated embodiment, the directional and vertical gyroscopes are disclosed as separately mounted and independent instruments. It should also be understood that the invention may be readily applied to three axis stable platforms of the two or three gyro type when such platforms are normally placed under the control of long period gravity references.

I am fully aware that erection cutoff devices of various forms have heretofore been provided, but I am also fully aware that many of these have not been completely satisfactory. Some have served to cut off erection only when the rate of turn of the craft exceeds some predetermined value while others have served to cut off erection only upon the bank angle of the craft exceeding a predetermined value.

If erection cutoff or erection modification, say of a vertical gyro, is based on a predetermined rate of turn only, say for example, 15° per minute, wind gusts and other minor turbulences in the air can cause the craft yaw rate to exceed 15° per minute and thereby cause the gyro erection control to be periodically cut out.

An erection cutout system based on bank angle has the advantage that since a bank angle usually results in a turn rate and hence a lateral acceleration, turn erection will not be cut out upon yawing only of the aircraft. However, if a bank erection cutoff system only is used, no cutoff will be possible until the aircraft actually does make a bank of a predetermined magnitude. In the bank-angle-only type of cutoff system, the cutoff angle cannot be set appreciably lower than 5 to 6° because if, for some reason, an angular error in the gyroscope exceeds this 5° or 6°, erection will be completely lost. For example, if a multi-engine aircraft has a failure of two engines on one wing and the craft is flown to maintain the heading, a wing-down condition of more than 6° to likely to occur. Under this condition, gyro erection would be cut off at a time when it is most needed. Furthermore, with such a system, the vertical gyro might cut itself off and eventually tumble under the following conditions:

(a) If the gyro were equipped with a fast erection system and the fast erection cycle were completed before the gyro were erected within 6° of the vertical;

(b) If the craft were on a ramp which is out of level by more than 6°;

(c) If, in taking off, a pitch error of more than 6° were accumulated, after which a 90° turn were made, the accumulated pitch error would be transferred to the roll axis.

It is therefore a primary object of my invention to provide an erection cutoff or modification system which combines the advantages of both the turn rate erection cutoff system and the bank angle erection cutoff system while eliminating or minimizing the disadvantages of each. This object is fulfilled by separately measuring craft turn or heading rate and craft bank angle and controlling the erection cutoff apparatus only when both of these measures exceed some predetermined value.

In most modern aircraft, some form of gyromagnetic compass is provided, and in most cases this compass system includes as a part thereof an instrument servo loop or follow-up loop which positions the compass card or compass indicator. Also, such a follow-up loop will, in most cases, and in accordance with good servo practice, employ some means for determining its speed of operation such as, for example, a tachometer generator, the signal from which is used to stabilize the follow-up loop. In accordance with a feature of the present invention, it is this generator signal that is used as a measure of the rate of turn of the craft. By using this signal, no separate turn rate gyro or other separate turn rate sensitive device is necessary although the teachings of the present invention certainly do not preclude the use of such separate devices if desired.

Other advantages of my invention will become clearly apparent as the description of a preferred embodiment thereof proceeds, reference being made to the accompanying drawings, wherein, FIG. 1 is a schematic diagram of an erection cutoff system embodying the teachings of the present invention; and FIG. 2 is a diagram which will aid in the understanding of the present inventive concepts.

Referring first to FIG. 2, it will be remembered that if a rate of turn cutoff system only is used and this is set to be effective at, say, 15° per minute, erection of the gyroscopic instrument or instruments will be severed whenever the craft turn rate exceeds 15° per minute. In the diagram of FIG. 2, areas A and B indicate the range of rate of turn cutoff. On the other hand, if bank angle only is used to cut off erection and this bank angle is set at 6°, the range of erection cutoff is depicted by areas A and C of FIG. 2. However, in accordance with the teachings of my invention, both a predetermined rate of turn and a predetermined bank angle must occur before erection will be cut off. Thus, the range of erection cutoff will be that depicted by shaded area A.

Referring now to FIG. 1 of the drawings, the gyroscopic device from which erection controls are severed is illustrated as a simple vertical gyroscope 10. However, it will be understood, as stated above, that it may be any gyroscopic device such as a two or three gyro platform which is caused to maintain a long term vertical and directional reference through pendulous or gravity responsive devices. The gyroscope 10 comprises a rotor case 11 within which a rotor (not shown) is journalled and driven at high speed by suitable conventional means. The rotor case 11 is supported in the usual fashion in a roll gimbal 12 which, in turn, is journalled in the aircraft with its trunnion axis parallel to the craft's fore-and-aft axis. Mounted on the rotor case 11 are suitable pendulous reference devices such as liquid levels 13 and 14, one mounted so as to be sensitive to tilts of the rotor case about the craft's roll axis and the other responsive to tilts of the rotor case about the craft's pitch axis. Upon such tilt of the rotor case, signals generated by the liquid levels are passed to conventional normal erection control circuits 15. The outputs of the normal erection control circuits 15 are applied to torque motors 16 and 17 on the roll and pitch axes, respectively, of the gyro 10 to apply torques about the proper axis to erect the gyro and thereby reduce to zero the tilt signals. The normal erection of a vertical gyroscope in accordance with tilt signals of liquid levels mounted thereon is so well known to those skilled in the art that specific details of the circuit arrangements are not deemed necessary. The normal erection controls 15 may be modified, severed or otherwise rendered ineffective by means of suitable erection cutoff or modification controls 18 which may merely be switches or other suitable devices which may serve, for example, to eliminate power from the gyro torquers or otherwise render the normal erection controls ineffective. Operation of the erection cutout controls 18 is instituted upon closure of relay actuated switch 19.

Most vertical gyroscopes for modern aircraft are provided with some form of quick erection controls depicted generally at 20 in FIG. 1. As is well known to those skilled in the art, these quick erection controls serve to bring the gyro to a vertical position in a matter of minutes rather than the much greater period of time which would be required if the normal erection controls of the gyro alone are employed. The quick erection control 20 is provided with a relay 21 which serves to keep the vertical gyro erection controls on during the fast erection cycle so that the gyro can be brought to its vertical position upon starting without any danger of the erection cutout system of the present invention severing erection control. A quick erection control and normal erection control apparatus suitable for use with the present invention is disclosed in U.S. Patent No. 2,879,672 in the name of P. J. Marino et al., which patent is assigned to the same assignee as the present invention.

The means responsive to the bank angle of the craft for controlling the erection cutoff or modification controls of the vertical gyro 10 is illustrated as a sector switch 22 which comprises a switch member 23 having an insulating sector 24 and a conducting sector 25. The insulating sector 24 may subtend an angle of approximately 192° and the conducting sector 25 may subtend an angle of 168°. Two contacts 26 and 27 are arranged to contact the member 23 on diametrically opposite sides thereof and the member 23 is so positioned with respect to the gimbal trunnion that rotation of the trunnion plus or minus 6° from its normal horizontal position will cause one or the other of the contacts 26, 27 to complete a circuit through the switch.

In accordance with one of the features of the present invention, the rate of turn measurement is derived from a craft heading reference system. In the present application, this is disclosed as a slaved gyromagnetic compass system which may be of the type disclosed in detail in copending application Serial No. 571,813, filed March 15, 1956, in the names of Jude and Miller entitled "Aircraft Automobile Pilots," and assigned to the same assignee as the present invention. Briefly, this compass system comprises a directional gyro 30 having the usual levelling controls (not shown) which is slaved to an earth's magnetic field responsive device such as a flux valve 31 through a follow-up servo loop indicated generally at 32. The details of the construction of the flux valve 31 may be found in U.S. Patent No. 2,383,461 in the name of Esval et al., which patent is also assigned to the same assignee as the present invention. The motor follow-up system 32 comprises generally an amplifier 33, the output of which controls motor 34 which positions first and second synchro control transformers 35 and 36 through shaft 37. In order to accurately control the speed of the follow-up loop 32, motor 34 also drives a speed generator or tachometer generator 38 whose output is fed back to amplifier 33 in accordance with conventional servo practice.

The compass or heading reference system operation is as follows. The orientation of the earth's magnetic field with respect to the aircraft is sensed by flux valve 31. This angular orientation is compared with the angular orientation of shaft 37 of follow-up system 32 in synchro control transformer 35 and any difference therebetween appears as an error signal which is amplified in amplifier 39 and applied to torque motor 40 on directional gyro 30 to thereby precess directional gyro 30 in a direction dependent upon the sense of the error signal. Due to the normally slow slaving rate of the gyro 30, the flux valve gyro-motor loop 32 has a relatively long time constant, that is, the gyro position is slowly slaved to the heading sensed by the flux valve and short term movements of the synchro 35 will not normally cause precession of the gyro. However, long term drift of the gyro will be sensed by synchro 35 and will precess the gyro back to its proper position. The position of the gyro, as detected by synchro transmitter 41, is likewise compared with the position of servo system shaft 37 through synchro control transformer 36 and any difference in the position between the gyro 30 and shaft 37 appears as an error signal from control transformer 36 and applied to follow-up amplifier 33 which drives motor 34 in a direction dependent upon the sense of such error.

As intimated above, the gyro follow-up loop is relatively fast so that short term yawing of the craft is immediately followed by turning of the motor shaft 37. Shaft 37 may also position a compass card 42 which provides both a short term and long term indication of the heading of the aircraft with respect to magnetic north. In other words, the gyro 30 provides an accurate indication of short term changes in heading while long term drift of the gyro 30 is prevented due to the slaving action of the flux valve 31.

Inasmuch as the tachometer generator 38 provides a voltage proportional to the speed of operation of the motor 34 which operates whenever the craft turns with respect to the gyro 30, this voltage is a measure of the rate of change of heading or rate of turn of the aircraft. It is this tachometer voltage which is used in the present system as the rate of turn erection cutout signal.

In the illustrated embodiment of the present invention, the turn rate or heading rate signal is obtained from a servo follow-up loop included in the compass system. However, it should be understood that this turn or heading rate signal may be obtained from other, although similar, sources. For example, if the aircraft is equipped with an automatic pilot of the type which employs a servo follow-up loop controlled in accordance with the heading of the aircraft, the tachometer generator in such a follow-up loop may be similarly used as the source of rate of turn or heading rate signal. Such a follow-up loop is illustrated in copending application Serial No. 813,097 filed May 14, 1959, in the names of Jude and Miller, entitled "Aircraft Automatic Pilots," which application is also assigned to the same assignee as the present invention.

In accordance with the teachings of the present invention, it is desired that the rate of turn signal produce no control effect on the erection cutout means until that signal has reached a predetermined value, say, for example, a value corresponding to 15° per minute. For this purpose, the rate of turn or heading rate sigal is applied to an amplifier 45 which is so biased as to produce an output only upon the turn rate signal reaching this predetermined value. Amplifier 45 may be a two-stage transistor amplifier comprising a first transistor 46 which is positively biased by means of voltage divider network 47, 48 for class A operation. The turn rate signal from generator 38 is applied to a step-down coupling transformer 49 and thence to the base of transistor 46. The amplified signal appearing across load resistor 50 is coupled to a second stage transistor 51 through coupling condenser 52 and potentiometer 56. Transistor 51 is class B operated so that only D.C. appears across its output load which, in the present embodiment, is a winding 53 of a relay 54. Condenser 55 serves to filter the D.C. output of transistor 51. The magnitude of the signal required to produce an operation of relay 54 is controlled by potentiometer 56. Resistor 57 serves to maintain transistor 51 at class B operation. Thus, the operation of amplifier 45 is to produce an operation of relay 54 only upon the measure or value of the heading rate signal reaching a predetermined magnitude.

The means responsive to both the bank angle and the rate of turn measures for actuating the cutoff control switch 19 upon each of said measures exceeding a predetermined value is a D.C. series circuit including turn rate switch 60, bank angle switch 22, a fast-slow relay control switch 61, and an erection cutoff relay winding 62, all connected between a source 63 of D.C. voltage and ground 64. Thus, erection cutoff relay 62 will only operate when all of the switches 60, 22, and 61 are closed. Switch 61 is usually closed during the normal operation of the system because relay winding 21 becomes energized after the quick erection cycle of the vertical gyro 10 is completed.

Thus, if the aircraft turns without banking, i.e., yaws, at a rate greater than 15° per minute, switch 60 will close. However, since it is not normally necessary to cut out erection under such yawing, erection is maintained due to open bank angle switch 22. Similarly, if the craft banks without turning, bank angle switch 22 will close but turn rate switch 60 will remain open and again gyroscopic erection will be maintained on. It is only when there is a combined turn rate of greater than 15° per minute and a bank angle of 6° or more that erection will be severed. Thus, upon closure of both switch 60 and 22, erection cutoff relay 62 will be energized, closing switch 19 and thereby operating erection cutoff controls 18 which, in turn, disables the normal erection controls 15 whereby the gyro 10 operates as a free gyro until both the craft bank angle and rate of turn drop below their predetermined set values.

While I have described my invention in its preferred embodiments, it is to be understood that the words which I have used are words of description rather than of limitation and that changes within the purview of the appended claims may be made without departing from the true scope and spirit of my invention in its broader aspects.

It should be understood that the specific turn rate and bank angle examples I have given in the foregoing are only examples and that these values may of course be changed to suit the particular characteristics of the aircraft on which the system is used.

What is claimed is:

1. In a gyroscopic instrument for aircraft of the type that is slaved to a pendulous reference and having a device for cutting off said slaving when said reference is adversely affected by lateral acceleration forces acting thereon and thereby cannot supply reliable reference data, the combination comprising means for providing a measure of the turn rate of the craft, means for provding a measure of the bank angle of the craft, and means responsive to both of said measures for actuating said cutoff device.

2. Apparatus as set forth in claim 1 wherein said turn rate measuring means includes a heading reference means and means responsive to the operation thereof for measuring the rate of change of heading of the craft.

3. Apparatus as set forth in claim 2 wherein said rate measuring means includes follow-up means controlled by said heading reference means and means operated thereby for providing a measure of the rate of operation thereof.

4. Apparatus as set forth in claim 3, further including amplifier means responsive to said follow-up rate measure for providing an output only upon said measure exceeding a predetermined magnitude.

5. Apparatus as set forth in claim 1 wherein said bank angle measuring means includes a vertical reference device and means controlled thereby for detecting bank angles of said craft greater than a predetermined value.

6. Apparatus as set forth in claim 5 wherein said bank angle detecting means comprises a sector switch for supplying an output when the bank angle exceeds said predetermined value.

7. Slaving cutout apparatus for gyroscopic instruments comprising directional reference means for detecting turning of the craft on which said apparatus is mounted and for supplying a signal in accordance with the rate of such turning, means responsive to said turn rate signal for supplying a control effect when said turn rate signal exceeds a predetermined value, vertical reference means for providing a measure of the bank angle of said craft and for supplying a control effect when said bank angle exceeds a predetermined value, and means coupling said control effects in series for supplying a slaving cutout signal.

8. In a gyroscopic instrument for aircraft of the type that is slaved to a pendulous reference and having a slaving cutoff device for removing said slaving when said reference is adversely affected by lateral acceleration forces acting thereon and thereby cannot supply reliable reference data, the combination comprising first and second switch means connected in series circuit relation with said cutoff device, means for supplying a signal in accordance with the rate of turn of said craft, means for supplying a signal in accordance with the bank angle of said craft, means for controlling said first switch means in accordance with a predetermined value of said rate of turn signal, and means for controlling said second switch means in accordance with a predetermined magnitude of said bank angle signal whereby both a predetermined rate of turn and a predetermined bank angle are required to actuate said slaving cutoff device.

9. In a gyroscopic instrument for aircraft of the type that is slaved to a pendulous reference and having a device for cutting off said slaving when said reference is adversely affected by lateral acceleration forces acting thereon and thereby cannot supply reliable reference data, the combination comprising means for providing a measure of the turn rate of the craft, means for providing a measure of the bank angle of the craft, means controlled in response to both of said measures only when each of said measures exceeds predetermined values, and means responsive to said last-mentioned means for actuating said cutoff device.

References Cited in the file of this patent
UNITED STATES PATENTS

| | | |
|---|---|---|
| 2,525,108 | Wolfert | Oct. 10, 1950 |
| 2,678,564 | Douglas et al. | May 18, 1954 |
| 2,763,157 | Summers | Sept. 18, 1956 |
| 2,879,670 | Ambrose et al. | Mar. 31, 1959 |